Jan. 25, 1949. G. HILL 2,459,880
BED-RAIL EXTENSION
Filed Dec. 22, 1945
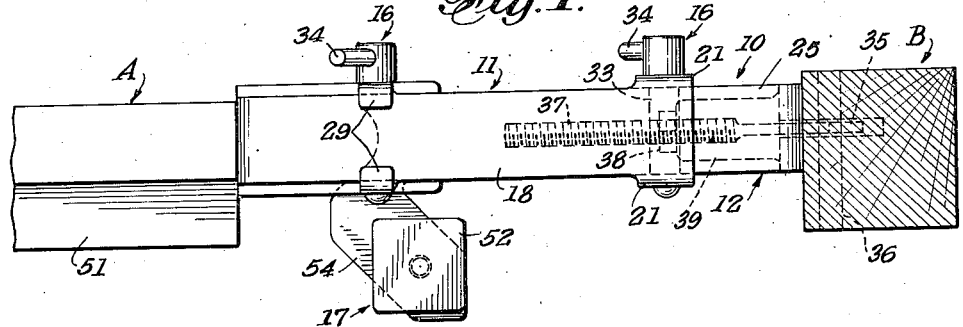
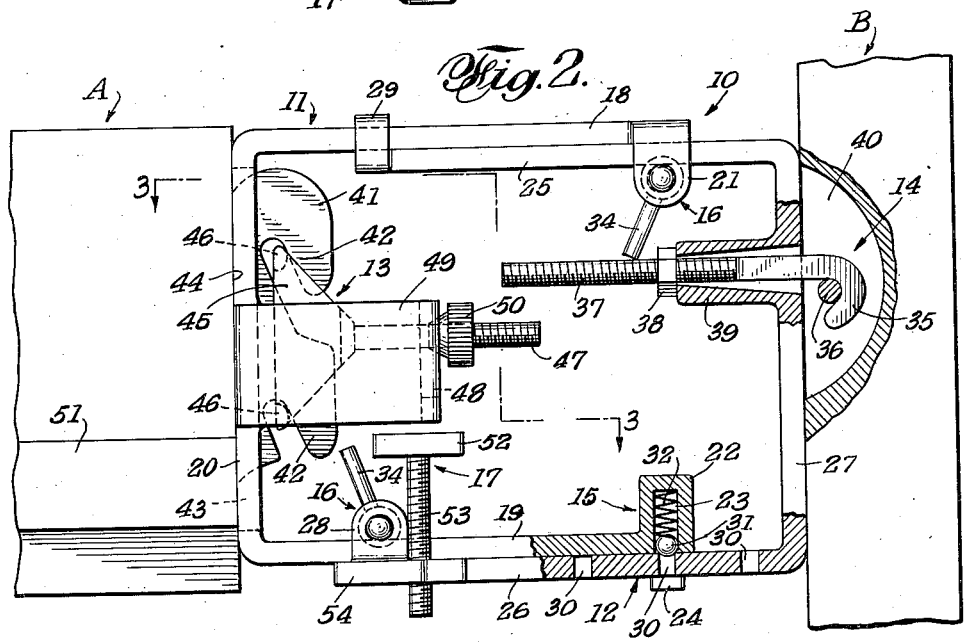
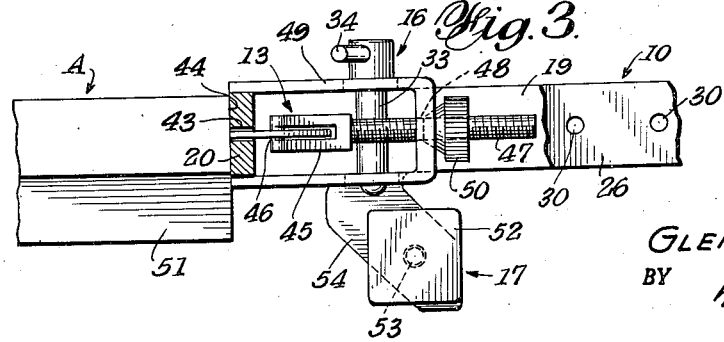
INVENTOR.
GLENN HILL
BY
ATTORNEYS Patented Jan. 25, 1949

2,459,880

UNITED STATES PATENT OFFICE 2,459,880

BED-RAIL EXTENSION

Glenn Hill, Los Angeles, Calif., assignor to Irvin
A. Brock, Los Angeles, Calif.

Application December 22, 1945, Serial No. 636,888

8 Claims. (Cl. 5—181)

This invention relates to a bed-rail extension and has for its primary object to provide simple, easily applied and effective means for extending bed-rails to lengthen a bed for the greater comfort of tall persons.

Another object of the invention is to provide a bed-rail extension which is also adapted to be variably lengthened.

Another object of the invention is to provide a bed lengthening device adapted to be interposed between each bed-rail and either the head- or foot-board of a bed.

Another object of the invention is to provide an adjustable bed-rail extension which is adapted to be applied without the aid of tools.

The foregoing objects and other objects, features and advantages of the invention will become clearly evident as the following description of the inventon progresses. Said description is based on the illustrated embodiment of the invention shown in the accompanying drawing which is presented as by way of illustration or example only.

In the drawing:

Figure 1 is a top plan view of a bed-rail extension according to the invention and shown in position between one end of a bed-rail and a post of a head- or foot-board.

Figure 2 is an inner, side view thereof, partly in cross-section.

Figure 3 is a plan sectional view as taken on the line 3—3 of Figure 2.

As shown in the drawings:

The embodiment of the invention which is shown in the drawing comprises, generally, an extension 10 formed by relatively adjustable frames 11 and 12 interposed between a bed-rail A and a post B of a bed. More specifically, the extension 10 includes means 13 for effecting removable connection of the frame to the bed-rail A, means 14 for connecting said extension to the bed post B, detent means 15 for retaining the frames 11 and 12 in adjusted position, means 16 for locking the frames in adjusted position, and means 17 forming a bed-spring or mattress support and, in effect, comprising an extension of the bed slats carried by the rails of the bed.

The frame 11 is shown as comprising a generally U-shaped strong metal member having spaced horizontal arms 18 and 19 and a connecting portion 20. The outer end of the arm 18 is provided with downreaching spaced ears 21 and the outer end of the leg 19 is provided with boss 22 having a blind hole 23 opening downwardly. The latter arm 19 also is provided with guide lugs 24.

The frame 12 is generally similar to the above-described frame 11 having spaced horizontal arms 25 and 26, a connecting portion 27, ears 28 on the outer end of the arm 27, and guide lugs 29 on the outer end of the arm 25.

The frames 11 and 12 are adapted to be assembled with the arms 18 and 25 and the arms 19 and 26 in respective engagement for relative sliding of the frames and with the frame portions 20 and 27 opposed as shown. It will be seen that the engaged arms are suitably aligned against angular displacement by the ears 21 and 28 and the lugs 24 and 29.

The rectangular extension thus provided can be longitudinally extended or contracted by sliding one frame with respect to the other.

The means 15 is provided for effecting said longitudinal adjustment of the extension 10 and comprises a plurality of holes or seats 30 in the arm 26, a detent ball 31 in the hole 23, and a spring 32 engaging said ball and forcing the ball into a selected seat 30.

The adjusted position of the frames of the extension is locked against inadvertent displacement by the means 16. In this case, said means comprises an eccentric cam 33 mounted between each pair of ears 21 and 28 and a handle 34 for rotating each eccentric to cause it to clamp the arms 18 and 25 and the arms 19 and 26, as the case may be.

The extension 10 thus provided can be readily and detachably mounted on a bed post by the means 14. Said means comprises a flattened hook 35 engaged about an existing cross pin 36 in the bed post and so engaged as to bring the frame portion 27 flat against the bed post. Said engagement is effected by a threaded shank 37 on said hook, a take-up nut 38 thereon, and a boss 39 on the frame 12 through which the shank passes and against which the nut abuts. By simply introducing the hook 35 into the slot 40 provided in the bed post, engaging the hook over the pin 36, and taking up firmly on the nut 38, the extension 10 is firmly connected to the bed post.

Typically, the end of the bed-rail A is provided with a hook 41 which conventionally is formed with down-reaching lugs 42. The means 13 is provided on the frame 10 for engaging the hook 41 to connect the bed-rail to the extension. To this end, the portion 20 is slotted at 43 so that said hook 41 may be inserted therein to bring the lugs 42 into the extension 10 as shown and to abut the end 44 against said portion 20.

The means 13 further comprises a generally triangular frame 45 carrying at each end cross pins or the like 46 adapted to engage the mentioned lugs 42 of the bed-rail hook 41. Said triangular frame 45 is provided with a threaded stem 47 which extends inwardly of the extension 10 and through a slot 48 in an extension 49 fixedly carried on the frame 11 of the bed-rail extension 10. A nut 50 is provided on the stem 47.

With the hook 41 engaged in the slot 43, the cross-pins 46 can be engaged with the lugs 42 by moving the frame 45 upwardly in the extension 49. Then, by taking up on the nut 50, the bed-rail A can be firmly pulled against the extension 10 to provide an effective extension for said bed-rail.

Bed-rails are usually provided with slat supporting strips or ledges 51. In order to provide a similar support in the extended portion of a bed, each extension is provided with the means 17. As shown, said means comprises a plate 52 on a threaded stem 53 engaged in an inward lateral extension 54 formed on the frame arm 26. Formed in this manner, the means 17 can be adjusted to any desired bed-spring or mattress supporting level.

In a modified form of the invention, designed to be non-extensible, the horizonal arms 18 and 19 are made integral with the arm 27, eliminating provision for sliding motion, and capable of being manufactured in any desired length. In this form the detent means 15, the locking means 16, the ears 21, the boss 22 and the guide lugs 24 are omitted.

Since the foregoing description of the present invention is intended as exemplary only and since variations thereof may be constructed within the spirit and scope of the invention, I desire to reserve to myself such modifications of the invention that may fall within the scope of the appended claims.

I claim:

1. A bed-rail extension comprising relatively slidable members, bed-post and bed-rail engaging means on said members, each member comprising a U-shaped frame, means for locating and adjusting one member in relation to the other, and means for locking said members together in adjusted relation.

2. A bed-rail extension comprising relatively slidable members, bed-post and bed-rail engaging means on said members, means for locating and adjusting one member in relation to the other, and means for locking said members together in adjusted relation, said latter means comprising eccentric cam wedges.

3. A bed-rail extension comprising relatively slidable members, bed-post and bed-rail engaging means on said members, each member comprising a U-shaped frame, means for locating and adjusting one member in relation to the other, and including a spring urged detent, and means for locking said members together in adjusted relation.

4. A bed-rail extension comprising relatively slidable members, bed-post and bed-rail engaging means on said members, means for locating and adjusting one member in relation to the other, and including a spring urged detent, and means for locking said members together in adjusted relation, said latter means comprising eccentric cam wedges.

5. A bed-rail extension comprising two relatively slidable and adjustable frame members, a bed post engaging hook carried by one member, means for engaging a bed-rail hook carried by the other member, said latter means having cross pins adapted for engagement with said bed-rail hook, and means for drawing the crosspins into hook engaging position.

6. In a bed-rail extension, a frame member having a slot to accommodate the end hook of a bed-rail, and means for engaging said hook to separably secure the extension to the bed-rail, said latter means having cross pins adapted for engagement with said hook, threaded means for drawing said cross pins into hook engaging position, a second frame member adapted to connect said first frame member to a bed-post and means connecting said first frame member and said second frame member.

7. In a bed-rail extension, a frame member having a slot to accommodate the end hook of a bed-rail, and means for engaging said hook to separably secure the extension to the bed-rail, said latter means including a generally triangular member formed of spaced plates and connected by upper and lower cross pins, a threaded stem on said triangular member, an abutment wall on the frame member, and a nut on the stem and adapted to engage said abutment wall to draw the triangular member and its cross pins into tight engagement with the hook on the bed-rail, a second frame member adapted to connect said first frame member to a bed-post and means connecting said first frame member and said second frame member.

8. A bed-rail extension comprising a member, another member slidable with respect to the first member, cross-pins in one of said members adapted to removably interlock with and fit into the hooks of a standard bed-rail, hook means in the other of said members adapted to removably interlock with and embrace a pin of a standard bed-post, and means for adjusting the distance between said cross-pins and said hook means including a screw device.

GLENN HILL.

REFERENCES CITED

The following references are of record in the file of this patent:

UNITED STATES PATENTS

| Number | Name | Date |
|---|---|---|
| 305,428 | Covert | Sept. 23, 1884 |
| 457,360 | Mason | Aug. 11, 1891 |
| 668,479 | Beihl | Feb. 19, 1901 |
| 852,776 | Druding | May 7, 1907 |
| 878,043 | Chrisman | Feb. 4, 1908 |
| 1,008,168 | Markus | Nov. 7, 1911 |
| 1,193,272 | Laforest | Aug. 1, 1916 |
| 1,292,951 | Ehoff | Jan. 28, 1919 |
| 1,751,037 | Howse | Mar. 18, 1930 |
| 1,964,405 | Nenne | June 26, 1934 |

FOREIGN PATENTS

| Number | Country | Date |
|---|---|---|
| 20,124 | Great Britain | 1894 |
| 610,133 | Germany | Mar. 4, 1935 |